United States Patent
DeRoy et al.

(10) Patent No.: US 11,008,948 B2
(45) Date of Patent: May 18, 2021

(54) ADAPTABLE DUAL DELTA-P FLOW MEASUREMENT

(71) Applicant: Hamilton Sundstrand Corporation, Charlotte, NC (US)

(72) Inventors: Robert M. DeRoy, Tolland, CT (US); Patrick Yung, South Windsor, CT (US); John M. Maljanian, Farmington, CT (US); Jeffry K. Kamenetz, Windsor, CT (US); Mark Vignali, Northfield, CT (US); John A. Schwemmer, Ellington, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 117 days.

(21) Appl. No.: 16/129,919

(22) Filed: Sep. 13, 2018

(65) Prior Publication Data

US 2020/0088107 A1    Mar. 19, 2020

(51) Int. Cl.
*F02C 9/18* (2006.01)
*B64D 13/06* (2006.01)
*B64D 13/04* (2006.01)

(52) U.S. Cl.
CPC .............. *F02C 9/18* (2013.01); *B64D 13/06* (2013.01); *B64D 13/04* (2013.01); *B64D 2013/0618* (2013.01)

(58) Field of Classification Search
CPC ..... F02C 9/18; F02C 6/08; F02C 7/18; B64D 2013/0603; B64D 2013/0611; B64D 2013/0618; B64D 13/04
See application file for complete search history.

(56) References Cited

U.S. PATENT DOCUMENTS

| | | | | |
|---|---|---|---|---|
| 5,155,991 A | * | 10/1992 | Bruun | B64D 13/04 454/74 |
| 5,511,385 A | * | 4/1996 | Drew | B64D 13/06 62/172 |

(Continued)

FOREIGN PATENT DOCUMENTS

| | | |
|---|---|---|
| DE | 10234968 A1 | 2/2004 |
| EP | 1333254 A2 | 8/2003 |
| WO | WO2009094734 A2 | 8/2009 |

OTHER PUBLICATIONS

"Differential Pressure Flowmeters," Mar. 17, 2012, Retrieved from the Internet: https://web.archive.org/web/20120317053735/https://www.omega.co.uk/literature/transactions/volume4/t9904-07-diff.html [Retrieved on Jan. 27, 2020].

(Continued)

*Primary Examiner* — Katheryn A Malatek
(74) *Attorney, Agent, or Firm* — Kinney & Lange, P.A.

(57) ABSTRACT

A system includes a venturi duct, a first delta P sensor, a second delta P sensor, and an ECS controller. The venturi duct is configured to receive a first bleed air flow or a second bleed air flow. The first and second delta P sensors are configured to sense a first and second pressure difference between a first point and a second point of the venturi duct. The first and second delta P sensors are configured to sense pressure difference over different pressure ranges. The ECS controller is configured determine a flow rate of an ECS air flow based upon the first pressure and/or second sensed pressure differences.

20 Claims, 1 Drawing Sheet

(56) References Cited

U.S. PATENT DOCUMENTS

| | | | |
|---|---|---|---|
| 6,688,184 B2* | 2/2004 | Army, Jr. .................. | G01F 1/44 |
| | | | 73/861.63 |
| 2009/0193811 A1* | 8/2009 | Monteiro .................. | F02C 9/18 |
| | | | 60/782 |
| 2015/0121909 A1 | 5/2015 | Koenig et al. | |
| 2015/0197339 A1* | 7/2015 | Johnson ................. | B64D 13/06 |
| | | | 62/129 |
| 2016/0347456 A1 | 12/2016 | Bruno et al. | |
| 2017/0233081 A1 | 8/2017 | Sautron et al. | |
| 2018/0057173 A1 | 3/2018 | Sautron | |

OTHER PUBLICATIONS

Woodhouse C E et al.: "Super fluid Helium Tanker Instrumentation," Instrumentation and Measurement Technology Conference. Washington, Apr. 25-27, 1989; [Proceedings of the Instrumentation and Measurement Technology Conference], New York, IEEE, US, vol. CONF. 6, Apr. 25, 1989, pp. 372-376, XP000041583.
Extended European Search Report for European Patent Application 19197028.4, dated Feb. 7, 2020, 11 pages.
Communication Pursuant to Article 94(3) EPC for European Patent Application No. 19197028.4, dated Feb. 9, 2021, 6 pages.

* cited by examiner

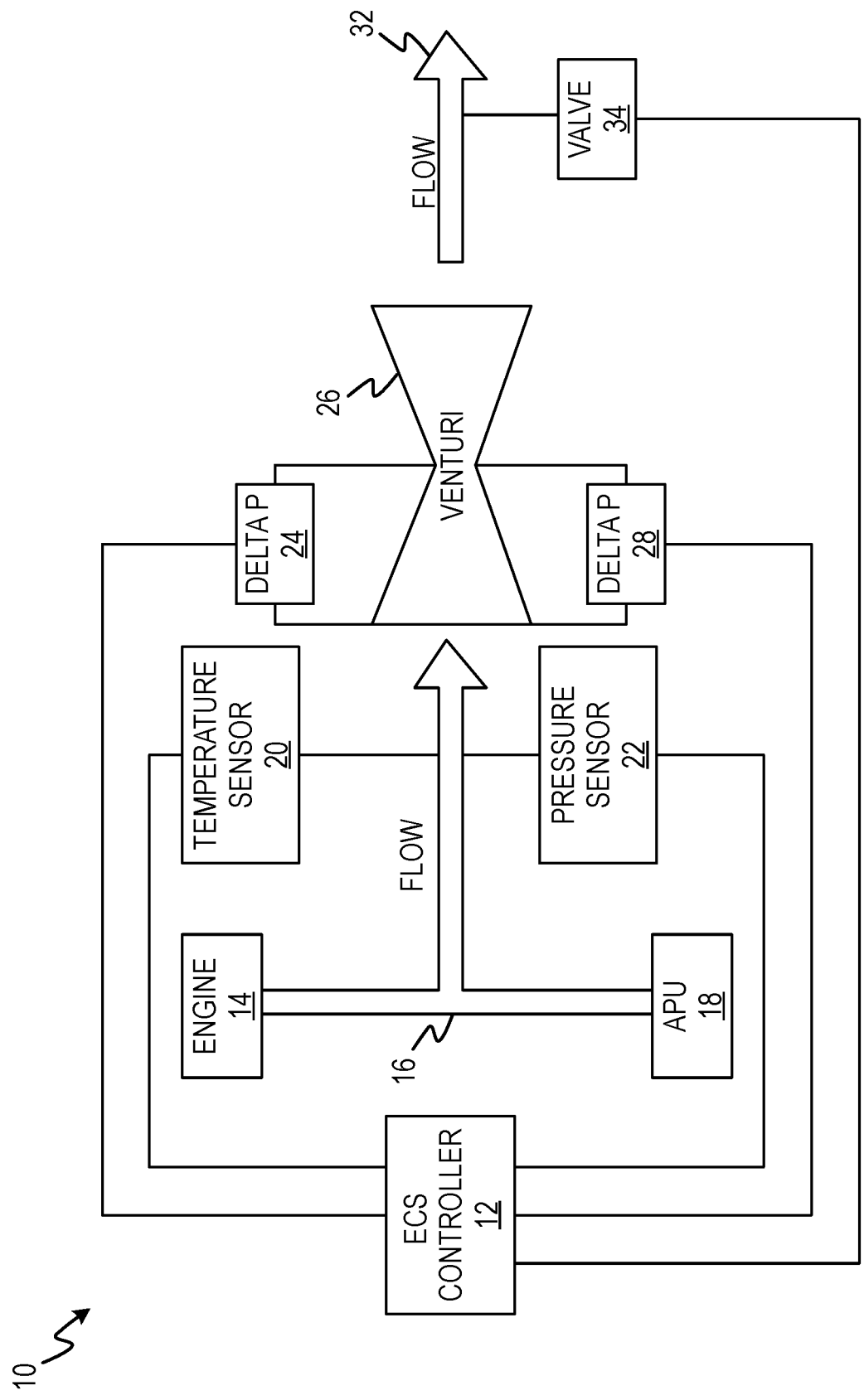

ADAPTABLE DUAL DELTA-P FLOW MEASUREMENT

BACKGROUND

Aircraft engine bleed air is utilized in aircraft environmental control systems and cabin pressurization systems. Bleed air is harvested from aircraft engines and aircraft auxiliary power units (APUs). Aircraft engines are becoming more fuel efficient and consequently, are more sensitive to engine bleed air usage. Aircraft environmental control system (ECS) flow is required to be measured when bleeding from aircraft engines or APUs. Accurate flow measurement is needed to ensure certification requirements for ventilation are met.

SUMMARY

In one example, a system comprises a venturi duct, a first delta P sensor, a second delta P sensor, and an ECS controller. The venturi duct is configured to receive a first bleed air flow or a second bleed air flow. The first delta P sensor is configured to sense a pressure difference between a first point and a second point of the venturi duct over a first pressure range and provide a first sensed pressure difference. The second delta P sensor is configured to sense the pressure difference between the first point and the second point of the venturi duct over a second pressure range and provide a second sensed pressure difference. The ECS controller is configured to receive the first and second pressure differences and determine a flow rate of an ECS air flow based upon the first pressure difference and/or the second pressure difference.

In one example, a method comprises providing a first bleed air flow from an aircraft engine or a second bleed airflow from an auxiliary power unit; sensing, using a first delta P sensor, a difference between a first and second point of a venturi duct over a first pressure range; providing, using the first delta P sensor, a first sensed pressure difference; sensing, using a second delta P sensor, the pressure difference between the first point and the second point of the venturi duct over a second pressure range; providing, using the second delta P sensor, a second sensed pressure difference; receiving, using an ECS controller, the first and second sensed pressure differences; determining, using the ECS controller, a flow rate of an ECS air flow based upon the first and/or second sensed pressure difference; and adjusting, using the ECS controller, a bleed extraction of the aircraft engine or the APU based upon the flow rate of the ECS air flow.

In one example, a system comprises an engine, and auxiliary power unit, a venturi duct, a first delta P sensor, a second delta P sensor, and an ECS controller. The engine is configured to provide a first bleed air flow. The auxiliary power unit is configured to provide a second bleed air flow. The venturi duct is configured to receive the first bleed air flow or the second bleed air flow. The first delta P sensor is configured to sense the pressure difference between a first point and a second point of the venturi duct over a first pressure range and provide a first sensed pressure difference. The first pressure range corresponds to an expected range of a flow rate of the first bleed air flow. The second delta P sensor is configured to sense the pressure difference between the first point and the second point of the venturi duct over a second pressure range and provide a second sensed pressure difference. The first point has a cross sectional area equal to that of an inlet of the venturi duct. The second point has a smaller cross sectional area than the inlet. The second pressure range corresponds to an expected range of the flow rate of the second bleed air flow. The ECS controller is communicatively coupled to the first and second delta P sensor. The ECS controller is configured to receive the first and second sensed pressure differences, determine a flow rate of an ECS air flow based upon the first and/or second sensed pressure difference, and adjust a bleed extraction of the engine or the APU based upon the flow rate of the ECS air flow.

BRIEF DESCRIPTION OF THE DRAWINGS

FIG. 1 is a diagram of an aircraft environmental control system.

DETAILED DESCRIPTION

Apparatus, systems, and associated methods relate aircraft environmental control systems. Fuel consumption of aircraft engines is directly impacted by bleed air extraction. Using the apparatus, systems, and associated methods herein, ECS air flow rates can be accurately determined when bleed air is provided by an aircraft engine and/or an auxiliary power unit. Two delta P sensors are utilized to measure the pressure difference of a venturi duct. Each delta P sensor is configured to a different pressure range. ECS air flow rates can be significantly higher during pull-up/down conditions while bleed air is extracted from the APU. One pressure range corresponds to higher flows rates, such as those during pull-up/down conditions while bleed air is extracted from the APU. The other pressure range covers lower ECS air flow rates. By utilizing two delta P sensors configured in this way, accuracy of ECS air flow rate determinations is increased over one or more delta P sensors configured to a single pressure range. More accurate ECS air flow rate determinations allow for less bleed extraction, thereby increasing fuel efficiency of aircraft engines. Fault detection, isolation, and prognostics are also improved due to independent sources of flow measurement provided by the delta P sensors.

FIG. 1 is a diagram of aircraft environmental control system 10 including ECS controller 12, engine 14, bleed air flow 16, APU 18, temperature sensor 20, pressure sensor 22, delta P sensor 24, venturi duct 26, delta P sensor 28, and ECS air flow 32, and outflow valve 34.

Bleed air flow 16 is provided by bleed extractions from engine 14 or APU 18. The temperature and pressure of bleed air flow 16 is sensed by temperature sensor 20 and pressure sensor 22 before reaching venturi duct 26. Venturi duct 26 includes a choke. The choke is a section of venturi duct 26 that has the smallest cross sectional area relative to the rest of venturi duct 26. The choke causes a decrease in pressure of bleed air flow 16 at the choke relative to sections with a larger cross sectional area such as the inlet and outlet of venturi duct 26. The inlet includes the length of venturi duct 26 before the cross sectional area begins to taper. The pressure difference from the inlet to the choke of venturi duct 26 is measured by delta P sensors 24 and 28. In some examples, the pressure difference is sensed from the choke to the outlet of venturi duct 26. ECS air flow 32 is the airflow downstream of venturi duct 26. ECS air flow 32 results from bleed air flow 16 flowing through venturi duct 26. Outflow valve 34 is controlled by ECS controller 12 to control the ECS air flow 32.

ECS controller 12 is configured to receive the sensed pressure from pressure sensor 22, the sensed temperatures from temperature sensors 20 and 30, and the sensed pressure differences from delta P sensors 24 and 28. Using the sensed pressure, the sensed temperatures, the sensed pressure differences, and characteristics of venturi duct 26, ECS controller 12 is configured to determine flow rates of ECS air flow 32. ECS controller 12 is configured to adjust bleed extraction of engine 14 or APU 18 based upon the flow rates of ECS air flow 32.

Volumetric flow rate ($Q_v$) of ECS air flow 32 can be calculated based upon the characteristics of venturi duct 26 and the pressure difference ($\Delta p$) from the inlet to the choke of venturi duct 26. Relevant characteristics of venturi duct 26 include cross sectional area of the inlet ($A_a$), cross sectional area of the choke ($A_b$), the tapering of cross sectional area from the inlet to the choke, and the fluid density (p). How venturi duct 26 tapers can affect the Reynolds Number (C) of bleed air flow 16. Volumetric flow rate can be calculated using:

$$Q_V = C \sqrt{\frac{2\Delta\rho}{\rho}} \frac{A_a}{\sqrt{\left(\frac{A_a}{A_b}\right)^2 - 1}} \quad \text{(Equation 1)}$$

Mass flow rate ($Q_{mass}$) can be calculated from the volumetric flow rate by multiplying the volumetric flow rate by the fluid density:

$$Q_{mass} = \rho Q_v \quad \text{(Equation 2)}$$

Fluid density is calculated using temperatures and pressures sensed by temperature sensor 20, pressure sensor 22, delta P sensors 24 and 28.

As can be seen from Equation 1, the accuracy of delta P sensors 24 and 28 impacts the accuracy of flow rate measurements of ECS air flow 32. Flow rate of ECS air flow 32 can fall within a different range when bleed air flow 16 is provided by engine 14 compared to when bleed air flow 16 is provided by APU 18 during pull-up/down conditions. The different flow rates yield different pressure ranges. To increase accuracy, delta P sensor 24 and delta P sensor 28 are configured to sense pressure difference over different pressure ranges. In one example, delta P sensor 24 is configured to sense pressure difference over a range corresponding to an expected range of the flow rate range of bleed air flow 16 when provided by engine 14. ECS controller 12 is configured to determine a flow rate of ECS air flow 32 based upon the pressure difference sensed by delta P sensor 24 when bleed air flow is provided by engine 14. Delta P sensor 28 is configured to sense pressure over a range corresponding to an expected range of the flow rate of bleed air flow 16 when provided by APU 18. Consequently, ECS controller 12 is configured to determine a flow rate of ECS air flow 32 based upon the pressure difference sensed by delta P sensor 28 when bleed air flow is provided by APU 18.

In some examples, delta P sensor 24 is configured to sense pressure difference at a range including a pressure corresponding to a lowest expected flow rate. Delta P sensor 28 is configured to sense a pressure difference at a range including a pressure corresponding to a highest expected flow rate. ECS controller 12 is configured to determine a flow rate of ECS air flow 32 based upon delta P sensor 24 when the pressure sensed by pressure sensor 22 falls within the pressure range of delta P sensor 24. ECS controller 12 is configured to determine a flow rate of ECS air flow 32 based upon delta P sensor 28 when the pressure sensed by pressure sensor 22 falls within the pressure range of delta P sensor 28.

In one example, the two pressure ranges overlap. In one example, the two pressures do not overlap. The use of two delta P sensors 24 and 28 allows precise and accurate pressure difference measurements to be made across a large range of pressures resulting from bleed air flow being provided by engine 14 and APU 18.

Accordingly, apparatus, systems, and associated methods herein, allow more efficient fuel consumption in aircraft engines. Utilizing the environmental control system described herein allows more accurate ECS air flow determination. This allows ECS systems to use less bleed extraction making for more efficient fuel consumption. This also allows for more efficient engine operation, extending the life of the engine because lower flows favorably impact internal engine operation and performance.

Discussion of Possible Embodiments

The following are non-exclusive descriptions of possible embodiments of the present invention.

A system can comprise a venturi duct configured to receive a first bleed air flow and/or a second bleed air flow; a first delta P sensor configured to sense a pressure difference between a first point and a second point of the venturi duct over a first pressure range, the first delta P sensor configured to provide a first sensed pressure difference; a second delta P sensor configured to sense the pressure difference between the first point and the second point of the venturi duct over a second pressure range and provide a second sensed pressure difference; and an environmental control system (ECS) controller configured to receive the first and/or second sensed pressure differences, determine a flow rate of an ECS air flow based upon the first and/or second sensed pressure differences, and adjust a bleed extraction of the aircraft engine or the APU based upon the flow rate of the ECS air flow.

The system of the preceding paragraph can optionally include, additionally and/or alternatively, any one or more of the following features, configurations and/or additional components:

A further embodiment of the foregoing system, wherein the first pressure range can correspond to an expected range of a flow rate of the first bleed air flow; the second pressure range can correspond to an expected range of a flow rate of the second bleed air flow; and the environmental control system controller can be configured to determine the flow rate of the ECS air flow based upon the first sensed pressure difference when the first bleed air flow is provided and to determine the flow rate of the ECS air flow based upon the second sensed pressure difference when the second bleed air flow is provided.

A further embodiment of the foregoing system, wherein the first point can be an inlet of the venturi duct; and the second point can be a choke of the venturi duct.

A further embodiment of the foregoing system, wherein the system can further comprise a first temperature sensor is configured to sense a temperature of the first and/or second bleed airflow upstream of the venturi duct wherein the ECS controller can be further configured to determine the flow rate of the ECS air flow based upon the sensed temperature of the first and/or second bleed airflow.

A further embodiment of the foregoing system, wherein the system can further comprise a first pressure sensor configured to sense a pressure of the first and/or second bleed airflow upstream of the venturi duct wherein the ECS controller is further configured to determine the flow rate of the ECS air flow based upon the sensed pressure of the first and/or second bleed airflow.

A further embodiment of the foregoing system, wherein the system can further comprise a valve downstream of the venturi duct, wherein the ECS controller is configured to control the valve to control a pressure of the ECS air flow.

A further embodiment of the foregoing system, wherein the first pressure range can include a pressure corresponding to a lowest expected flow rate; the second pressure range can include a pressure corresponding to a highest expected flow rate; and the environmental control system controller can be configured to determine the flow rate of the ECS air flow based upon the first sensed pressure difference when the sensed pressure of the first and/or second bleed airflow upstream of the venturi duct falls within the first pressure range and to determine the flow rate of the ECS air flow based upon the second sensed pressure difference when the sensed pressure of the first and/or second bleed airflow upstream of the venturi duct falls within the second pressure range.

A method can comprise providing a first bleed air flow from an aircraft engine and/or a second bleed airflow from an auxiliary power unit (APU); sensing, using a first delta P sensor, a pressure difference between a first and second point of a venturi duct over a first pressure range; providing, using the first delta P sensor, a first sensed pressure difference; sensing, using a second delta P sensor, the pressure difference between the first point and the second point of the venturi duct over a second pressure range; providing, using the second delta P sensor, a second sensed pressure difference; receiving, using an environmental control system (ECS) controller, the first and second pressure differences; determining, using the ECS controller, a flow rate of an ECS air flow based upon the first and/or second sensed pressure differences; and adjusting, using the ECS controller, a bleed extraction of the aircraft engine or the APU based upon the flow rate of the ECS air flow.

The method of the preceding paragraph can optionally include, additionally and/or alternatively, any one or more of the following features, configurations and/or additional components:

A further embodiment of the foregoing method, wherein the first pressure range can correspond to an expected range of a flow rate of the first bleed air flow; the second pressure range can correspond to an expected range of a flow rate of the second bleed air flow; and determining the flow rate of the ECS air flow can be based upon the first sensed pressure difference when the first bleed air flow is provided and the second sensed pressure difference when the second bleed air flow is provided.

A further embodiment of the foregoing method, wherein the first point can be an inlet of the venturi duct; and the second point can be a choke of the venturi duct.

A further embodiment of the foregoing method, wherein the method can further comprise a first temperature sensor configured to sense a temperature of the first and/or second bleed airflow upstream of the venturi duct wherein the ECS controller is further configured to determine the flow rate of the ECS air flow based upon the sensed temperature of the first and/or second bleed airflow.

A further embodiment of the foregoing method, wherein the method can further comprise sensing, using a first pressure sensor, a pressure of the first and/or second bleed airflow upstream of the venturi duct, and wherein determining the flow rate of the ECS air flow is further based upon the sensed pressure of the first and/or second bleed airflow.

A further embodiment of the foregoing method, wherein the method can further comprise controlling, using a valve, a pressure of the ECS air flow.

A further embodiment of the foregoing method, wherein the first pressure range can include a pressure corresponding to a lowest expected flow rate; the second pressure range can include a pressure corresponding to a highest expected pressure; and determining the flow rate of the ECS air flow is based upon the first sensed pressure difference when the sensed pressure of the first and/or second bleed airflow upstream of the venturi duct falls within the first pressure range and to determine the flow rate of the ECS air flow based upon the second sensed pressure difference when the sensed pressure of the first and/or second bleed airflow upstream of the venturi duct falls within the second pressure range.

A system can comprise an engine configured to provide a first bleed air flow; an auxiliary power unit (APU) configured to provide a second bleed air flow; a venturi duct configured to receive the first bleed air flow and/or the second bleed air flow, the venturi duct including a first point having a cross sectional area equal to that of an inlet of the venturi duct and a second point having a smaller cross sectional area than the inlet; a first delta P sensor configured to sense a pressure difference between the first point and the second point of the venturi duct over a first pressure range and provide a first sensed pressure difference, the first pressure range corresponding to an expected range of a flow rate of the first bleed air flow; a second delta P sensor configured to sense the pressure difference between the first point and the second point of the venturi duct over a second pressure range, the second pressure range corresponding to an expected range of a flow rate of the second bleed air flow; and an environmental control system (ECS) controller communicatively coupled to the first and second delta P sensor, the ECS controller configured to receive the first and second sensed pressure differences and determine a flow rate of an ECS air flow based upon the first and/or second sensed pressure differences, and adjust a bleed extraction of the engine or the APU based upon the flow rate of the ECS air flow.

The system of the preceding paragraph can optionally include, additionally and/or alternatively, any one or more of the following features, configurations and/or additional components:

A further embodiment of the foregoing system, wherein the system can further comprise a first temperature sensor configured to sense a temperature of the first and/or second bleed airflow upstream of the venturi duct, the first temperature sensor communicatively coupled to the ECS controller, wherein the ECS controller can be further configured to determine the flow rate of the ECS air flow based upon the sensed temperature of the first and/or second bleed airflow.

A further embodiment of the foregoing system, wherein the system can further comprise a first pressure sensor configured to sense a pressure of the first and/or second bleed airflow upstream of the venturi duct, the first pressure sensor communicatively coupled to the ECS controller, wherein the ECS controller is further configured to determine the flow rate of the ECS air flow based upon the sensed pressure of the first and/or second bleed airflow.

A further embodiment of the foregoing system, wherein the system can further comprise a valve downstream of the venturi duct, the valve communicatively coupled to the ECS controller, wherein the ECS controller is configured to control the valve to control a pressure of the ECS air flow.

A further embodiment of the foregoing system, wherein the first pressure range can include a pressure corresponding to a lowest expected flow rate; the second pressure range can include a pressure corresponding to a highest expected flow rate; and the environmental control system controller can be configured to determine the flow rate of the ECS air flow based upon the first sensed pressure difference when the sensed pressure of the first and/or second bleed airflow upstream of the venturi duct falls within the first pressure range and to determine the flow rate of the ECS air flow based upon the second sensed pressure difference when the sensed pressure of the first and/or second bleed airflow upstream of the venturi duct falls within the second pressure range.

A further embodiment of the foregoing system, wherein the engine can be an aircraft engine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
   a venturi duct configured to receive a first bleed air flow from an aircraft engine and a second bleed air flow from an auxiliary power unit (APU);
   a first delta P sensor configured to sense a pressure difference between a first point and a second point of the venturi duct over a first pressure range, the first delta P sensor configured to provide a first sensed pressure difference, wherein the first pressure range corresponds to an expected range of a flow rate of the first bleed air flow;
   a second delta P sensor configured to sense the pressure difference between the first point and the second point of the venturi duct over a second pressure range and provide a second sensed pressure difference, wherein the second pressure range corresponds to an expected range of a flow rate of the second bleed air flow, and wherein the second pressure range is different from the first pressure range; and
   an environmental control system (ECS) controller configured to receive the first and second sensed pressure differences, determine a flow rate of an ECS air flow based upon the first and/or second sensed pressure differences, and adjust a bleed extraction of the aircraft engine or the APU based upon the flow rate of the ECS air flow.

2. The system of claim 1, wherein
   the ECS controller is configured to determine the flow rate of the ECS air flow based upon the first sensed pressure difference when the first bleed air flow is provided and to determine the flow rate of the ECS air flow based upon the second sensed pressure difference when the second bleed air flow is provided.

3. The system of claim 1, wherein:
   the first point is an inlet of the venturi duct; and
   the second point is a choke of the venturi duct.

4. The system of claim 1, further comprising a first temperature sensor configured to sense a temperature of the first and/or second bleed airflow upstream of the venturi duct wherein the ECS controller is further configured to determine the flow rate of the ECS air flow based upon the sensed temperature of the first and/or second bleed airflow.

5. The system of claim 4, further comprising a first pressure sensor configured to sense a pressure of the first and/or second bleed airflow upstream of the venturi duct wherein the ECS controller is further configured to determine the flow rate of the ECS air flow based upon the sensed pressure of the first and/or second bleed airflow.

6. The system of claim 5, further comprising a valve downstream of the venturi duct, wherein the ECS controller is configured to control the valve to control a pressure of the ECS air flow.

7. A system comprising:
   a venturi duct configured to receive a first bleed air flow and a second bleed air flow;
   a first delta P sensor configured to sense a pressure difference between a first point and a second point of the venturi duct over a first pressure range, the first delta P sensor configured to provide a first sensed pressure difference, wherein the first pressure range includes a pressure corresponding to a lowest expected flow rate;
   a second delta P sensor configured to sense the pressure difference between the first point and the second point of the venturi duct over a second pressure range and provide a second sensed pressure difference, wherein the second pressure range includes a pressure corresponding to a highest expected flow rate;
   a first temperature sensor configured to sense a temperature of the first and/or second bleed airflow upstream of the venturi duct;
   a first pressure sensor configured to sense a pressure of the first and/or second bleed airflow upstream of the venturi duct; and
   an ECS controller configured to receive the first and second sensed pressure differences, to determine a flow rate of an ECS air flow, and to adjust a bleed extraction of an aircraft engine or an auxiliary power unit (APU) based upon the flow rate of the ECS air flow;
   wherein the ECS controller determines the flow rate of the ECS air flow based on the first sensed pressure difference, the sensed temperature of the first and/or second bleed airflow, and the sensed pressure of the first and/or second bleed airflow when the sensed pressure of the first and/or second bleed airflow upstream of the venturi duct falls within the first pressure range, and
   wherein the ECS controller determines the flow rate of the ECS air flow based upon the second sensed pressure difference, the sensed temperature of the first and/or second bleed airflow, and the sensed pressure of the first and/or second bleed airflow when the sensed pressure of the first and/or second bleed airflow upstream of the venturi duct falls within the second pressure range.

8. A method comprising:
   providing a first bleed air flow from an aircraft engine and/or a second bleed airflow from an auxiliary power unit (APU);
   sensing, using a first delta P sensor, a pressure difference between a first and second point of a venturi duct over a first pressure range, wherein the first pressure range corresponds to an expected range of a flow rate of the first bleed air flow;
   providing, using the first delta P sensor, a first sensed pressure difference;
   sensing, using a second delta P sensor, the pressure difference between the first point and the second point of the venturi duct over a second pressure range, wherein the second pressure range corresponds to an expected range of a flow rate of the second bleed air flow, and wherein the second pressure range is different from the first pressure range;

providing, using the second delta P sensor, a second sensed pressure difference;

receiving, using an environmental control system (ECS) controller, the first and second pressure differences;

determining, using the ECS controller, a flow rate of an ECS air flow based upon the first and/or second sensed pressure differences; and adjusting, using the ECS controller, a bleed extraction of the aircraft engine or the APU based upon the flow rate of the ECS air flow.

9. The method of claim 8, wherein
determining the flow rate of the ECS air flow is based upon the first sensed pressure difference when the first bleed air flow is provided and the second sensed pressure difference when the second bleed air flow is provided.

10. The method of claim 8, wherein:
the first point is an inlet of the venturi duct; and
the second point is a choke of the venturi duct.

11. The method of claim 8, further comprising a first temperature sensor configured to sense a temperature of the first and/or second bleed airflow upstream of the venturi duct wherein the ECS controller is further configured to determine the flow rate of the ECS air flow based upon the sensed temperature of the first and/or second bleed airflow.

12. The method of claim 11, further comprising:
sensing, using a first pressure sensor, a pressure of the first and/or second bleed airflow upstream of the venturi duct, and
wherein determining the flow rate of the ECS air flow is further based upon the sensed pressure of the first and/or second bleed airflow.

13. The method of claim 12, further comprising
controlling, using a valve, a pressure of the ECS air flow.

14. The method of claim 12, wherein:
the first pressure range includes a pressure corresponding to a lowest expected flow rate;
the second pressure range includes a pressure corresponding to a highest expected pressure; and
determining the flow rate of the ECS air flow is based upon the first sensed pressure difference when the sensed pressure of the first and/or second bleed airflow upstream of the venturi duct falls within the first pressure range and to determine the flow rate of the ECS air flow based upon the second sensed pressure difference when the sensed pressure of the first and/or second bleed airflow upstream of the venturi duct falls within the second pressure range.

15. A system comprising:
an engine configured to provide a first bleed air flow;
an auxiliary power unit (APU) configured to provide a second bleed air flow;
a venturi duct configured to receive the first bleed air flow and the second bleed air flow, the venturi duct including a first point having a cross sectional area equal to that of an inlet of the venturi duct and a second point having a smaller cross sectional area than the inlet;
a first delta P sensor configured to sense a pressure difference between the first point and the second point of the venturi duct over a first pressure range and provide a first sensed pressure difference, the first pressure range corresponding to an expected range of a flow rate of the first bleed air flow;
a second delta P sensor configured to sense the pressure difference between the first point and the second point of the venturi duct over a second pressure range and provide a second sensed pressure difference, the second pressure range corresponding to an expected range of a flow rate of the second bleed air flow, wherein the second pressure range is different from the first pressure range; and
an environmental control system (ECS) controller communicatively coupled to the first and second delta P sensor, the ECS controller configured to receive the first and second sensed pressure differences and determine a flow rate of an ECS air flow based upon the first and/or second sensed pressure differences, and adjust a bleed extraction of the engine or the APU based upon the flow rate of the ECS air flow.

16. The system of claim 15, further comprising a first temperature sensor configured to sense a temperature of the first and/or second bleed airflow upstream of the venturi duct, the first temperature sensor communicatively coupled to the ECS controller, wherein the ECS controller is further configured to determine the flow rate of the ECS air flow based upon the sensed temperature of the first and/or second bleed airflow.

17. The system of claim 16, further comprising a first pressure sensor configured to sense a pressure of the first and/or second bleed airflow upstream of the venturi duct, the first pressure sensor communicatively coupled to the ECS controller, wherein the ECS controller is further configured to determine the flow rate of the ECS air flow based upon the sensed pressure of the first and/or second bleed airflow.

18. The system of claim 17, further comprising a valve downstream of the venturi duct, the valve communicatively coupled to the ECS controller, wherein the ECS controller is configured to control the valve to control a pressure of the ECS air flow.

19. A system comprising:
an engine configured to provide a first bleed air flow;
an auxiliary power unit (APU) configured to provide a second bleed air flow;
a venturi duct configured to receive the first bleed air flow and the second bleed air flow, the venturi duct including a first point having a cross sectional area equal to that of an inlet of the venturi duct and a second point having a smaller cross sectional area than the inlet;
a first delta P sensor configured to sense a pressure difference between the first point and the second point of the venturi duct over a first pressure range and provide a first sensed pressure difference, the first pressure range corresponding to an expected range of a flow rate of the first bleed air flow, wherein the first pressure range includes a pressure corresponding to a lowest expected flow rate;
a second delta P sensor configured to sense the pressure difference between the first point and the second point of the venturi duct over a second pressure range and provide a second sensed pressure difference, the second pressure range corresponding to an expected range of a flow rate of the second bleed air flow, wherein the second pressure range includes a pressure corresponding to a highest expected flow rate;
a first temperature sensor configured to sense a temperature of the first and/or second bleed airflow upstream of the venturi duct, the first temperature sensor communicatively coupled to the ECS controller;
a first pressure sensor configured to sense a pressure of the first and/or second bleed airflow upstream of the venturi duct, the first pressure sensor communicatively coupled to the ECS controller; and an ECS controller configured to receive the first and second sensed pressure differences, to determine a flow rate of an ECS air flow, and to adjust a bleed extraction of an aircraft engine or an auxiliary power unit (APU) based upon the flow rate of the ECS air flow;

wherein the ECS controller determines the flow rate of the ECS air flow based on the first sensed pressure difference, the sensed temperature of the first and/or second bleed airflow, and the sensed pressure of the first and/or second bleed airflow when the sensed pressure of the first and/or second bleed airflow upstream of the venturi duct falls within the first pressure range, and wherein the ECS controller determines the flow rate of the ECS air flow based upon the second sensed pressure difference, the sensed temperature of the first and/or second bleed airflow, and the sensed pressure of the first and/or second bleed airflow when the sensed pressure of the first and/or second bleed airflow upstream of the venturi duct falls within the second pressure range.

20. The system of claim 15, wherein the engine is an aircraft engine.

* * * * *